Feb. 1, 1966 J. RABINOW 3,232,506

OPTICAL CARD TRANSLATOR SYSTEMS

Original Filed June 14, 1957 2 Sheets-Sheet 1

INVENTOR.

Jacob Rabinow

BY Max L. Libman

& Joseph A. Genovese

ATTORNEYS

Feb. 1, 1966 J. RABINOW 3,232,506

OPTICAL CARD TRANSLATOR SYSTEMS

Original Filed June 14, 1957

2 Sheets-Sheet 2

INVENTOR.
Jacob Rabinow

BY Max L. Libman
& Joseph A. Genovese

ATTORNEYS 3,232,506
Patented Feb. 1, 1966

3,232,506

OPTICAL CARD TRANSLATOR SYSTEMS

Jacob Rabinow, Takoma Park, Md., assignor, by mesne assignments, to Control Data Corporation, Minneapolis, Minn., a corporation of Minnesota Original application June 14, 1957, Ser. No. 665,763. Divided and this application Feb. 20, 1962, Ser. No. 174,498
8 Claims. (Cl. 225—93)

This application is a division of application Serial No. 665,763 which was filed on June 14, 1957, and which is now abandoned.

This invention relates to information handling devices and, more particularly, to devices for storing, encoding, decoding, and manipulating information by optical apparatus.

The invention represents an improvement over prior devices and systems for the manipulation of information. Although there has been some past interest in the use of optical devices for the handling of information, by-and-large, the emphasis has been on electronic devices.

There is need for equipment which, for example, will rapidly and accurately translate information from one code or language into another, in which each code (or language) comprises a large number of possible choices. It is desirable to have a system which will rapidly and accurately present the English language equivalent of a technical article written in a different language, for example in German. A machine vocabulary of approximately 10,000 words would probably serve most technical fields adequately. When a German word is presented to the system, the system should be able to produce or display the English word equivalent from its assumed vocabulary of 10,000 words; and at a minimum cost of equipment, money and space.

It is theoretically possible, by utilizing known electronic or relay matrix techniques, to construct a machine which will translate as set forth above, but since each form of matrix has its serious disadvantages, such machines have not been feasible. Relay matrices are large and slow-acting; requiring large amounts of operating power and space. The relays, being mechanical structures and having moving parts with mass, have long operating times and require constant maintenance. Since, for the machine mentioned above, a minimum of 600,000 relays would be required (assuming five bits per character and twelve characters per word), the maintenance and wear problems become serious.

The optical valve, or function table, of this invention comprises a deck or stack of opaque cards or sheets, each having transparent portions arranged in patterns. Means are provided for moving individual cards into one of several possible positions with respect to the other cards, whereby transparent portions of the various cards are aligned with each other in at least one location on the face of the cards. Light is caused to penetrate the deck of cards through the aligned transparent portions. Movement of the cards into different combinations of card positions results in the alignment of transparent portions in different locations to change the locations at which light emanates from the pack. The positions at which light penetrates the pack are determined by the positioning of all the cards in the pack.

Each position at which light could penetrate each card may represent a bit of information, and the light valves described above could readily be used with photosensitive devices to provide flexible information handling systems.

It is, therefore, an object of this invention to provide new and improved information handling apparatus.

It is another object of this invention to provide new and improved information handling apparatus utilizing optical components.

It is a further object of this invention to provide new and improved information handling apparatus utilizing optical components for the storage, encoding, decoding and general handling of information.

Another object of this invention is to provide new and improved light valves in the form of movable cards having pre-formed apertures covered with a thin, opaque frangible coating which can be readily removed, as by passing a pin through any desired aperture or apertures to leave a clean hole capable of transmitting light. This can be done to any number of stacked cards after they have been individually moved or set in accordance with a desired input code, as by passing the pin through a plurality of stacked cards to leave an aperture through the entire set of cards at a specified location, which location then identifies specific input data to which the card setting corresponds.

According to the invention, each card of a set of cards is prepared by first preforming a matrix of holes or apertures at each of a plurality of possible positions, and then all of the holes are covered with a thin layer of opaque, frangible material such as a suitable lacquer. The members of the stack of cards are moved to positions corresponding to a unique code representation and a pin is then passed through all of the coatings covering an aligned set of aperture locations. Thereafter when the cards are again moved into that code configuration, light can pass through all of the aligned apertures so formed, thus identifying that particular code configuration.

Further objects and advantages of this invention will become apparent to those skilled in the art during a reading of the following specification taken together with the accompanying drawings, in which.

Figure 1:
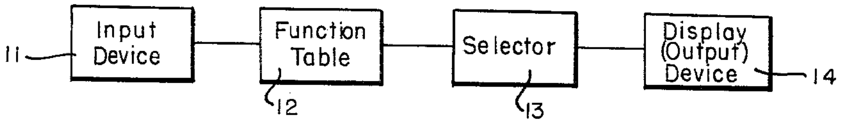
FIG. 1 is a block diagram of an information handling system.

Referring now to the drawings in detail and, more particularly to FIG. 1, the reference character 11 designates a block representative of an information input device to an information handling system. The input device 11 may be any well known apparatus for introducing information into information handling systems. Examples of such devices are magnetic tape recorders, punch card readers, and the like. The information introduced by the input device 11 is applied to the input of a light valve (or function table) 12 in a form usable thereby. The function table 12, which will be described in detail below, decodes the information supplied to it and transfers the results of the decoding to a selector 13. In the selector 13, the decoded information is encoded into a form readily usable by an output or display device 14.

The example of the translating equipment mentioned above will be used to explain the operation of the system of FIG. 1. The article to be translated into English is first put into a form which can be sensed by the input device 11. This may involve punching the article on punched cards or recording it on magnetic tape. The input device 11 then reads this article and transmits signals representative of the information fed into it to the function table 12.

The function table 12 is so set up that it translates each piece of information fed into it into unique signals. The signal output of the function table 12 is different for each combination of input signals supplied to it and may be considered as representative of the word introduced into the input of the system. The signals generated by the function table 12 are applied to the input of the selector 13 which encodes the signals received by it into signals representative of the appropriate English equivalent. When the signal output of the selector 13 is applied to the output of display device 14, the output device 14 responds by displaying or otherwise making available the English word equivalent of the word, German in this example, applied at the input to the system.

Figure 2:
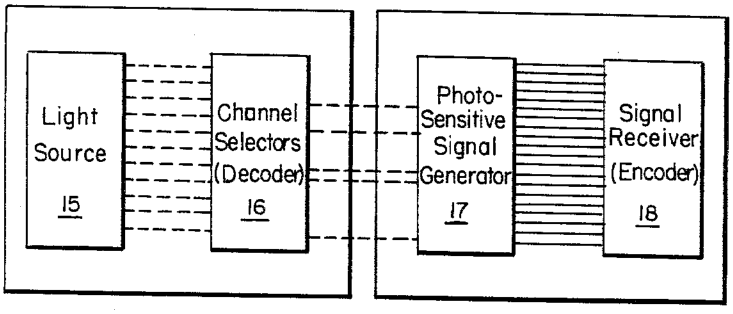
FIG. 2 is an enlarged block diagram of a portion of FIG. 1.

The operation of the system of FIG. 1 will become clearer with a description of FIG. 2. A light source 15 (FIG. 2) illuminates one side of a decoder or channel selector 16, and the light source 15 and the decoder 16 comprise the function table 12 of FIG. 1. Light from the source 15 is permitted to pass through portions of the decoder 16 and to impinge upon restricted areas of a photo-sensitive signal generator 17. The output of the signal generator 17 is applied to an encoder 18 for supplying the output device 14 with the proper operating energy.

In operation, signals from the input device 11 which represent a particular piece of information, for example a German word, operate the decoder 16, in a manner which will become more evident below, to cause the decoder to transmit light in a pattern which is representative of that word alone. To translate the light pattern representative of the word at the input of the system into its English equivalent, the light penetrating the decoder 16 is applied to the surface of the photo-sensitive signal generator 17 in a related pattern. The output of the signal generator 17 is applied to the encoder 18 which generates signals representative of the desired English word in a form usable by the output device 14.

Figure 3:
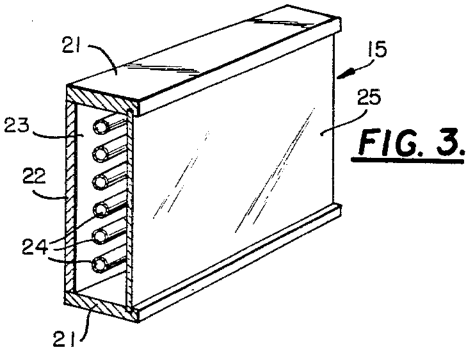
FIG. 3 is a perspective view in section of a light source suitable for use in this invention.

FIG. 3 illustrates one suitable form of light source 15 comprising a shallow box having sides 21 and a back 22. The back 22 has a polished reflecting inner surface 23 adjacent lamps 24 which may be incandescent, fluorescent, arc, or any other desired type. A transparent or translucent plate 25 forms the front of the box and comprises that portion through which light passes, and it is preferred, but by no means necessary, that the plate 25 be ground, etched or otherwise treated to diffuse light. The box may or may not have end closures as desired.

Figure 4:
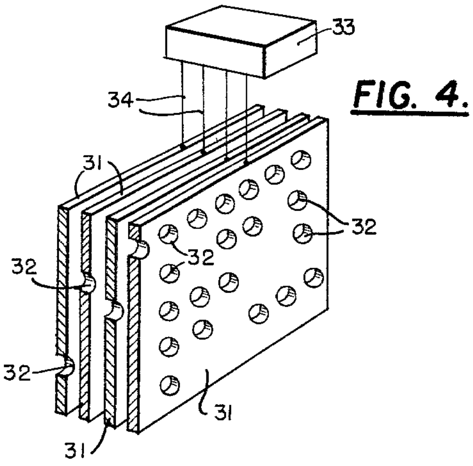
FIG. 4 is a perspective view, partially in section, of a light valve which employs the principles of this invention.

Referring to FIG. 4, a decoder (or channel selector) 16 is illustrated in detail comprising a stack of perforated cards or sheets 31. Perforations 32 through the individual cards are arranged in patterns which determine the decoding operation of the ensemble. Movement of the cards 31, effecting alignment of the perforations 32, is accomplished by a mechanism 33 through connecting linkages such as stiff wires 34. The operating mechanism 33 comprises a plurality of solenoids, pneumatic motors, or other suitable driving means which are individually responsive to signals from the input device 11.

In the operation of the light valve of FIG. 4, the signals from the input device 11 are applied to the operating mechanism 33. For this discussion, we shall assume that the operating means are solenoids, one solenoid being provided for each of the cards 31. When in receipt of a signal from the input device 11, each solenoid causes its card to move a predetermined distance which is equal to the spacing between perforations 32. Preferably, the limits of the movement of the cards are determined by fixed stops against which the cards are driven. Signals from the input device 11 are thus applied to the individual solenoids to actuate them, and in response to the signals received by the solenoids, the individual cards are moved. The holes 32 are so located in the cards 31 that different combinations of movements of the cards 31 result in the registration of the perforations 32 in different locations, each location of aligned holes 32 being unique for a given combination of signals from the input device 11. The principles of operation will be more readily understood by a review of the description of the following FIGS. 5 through 11.

Figures 5, 6, 7, 8, 9, 10, 11:
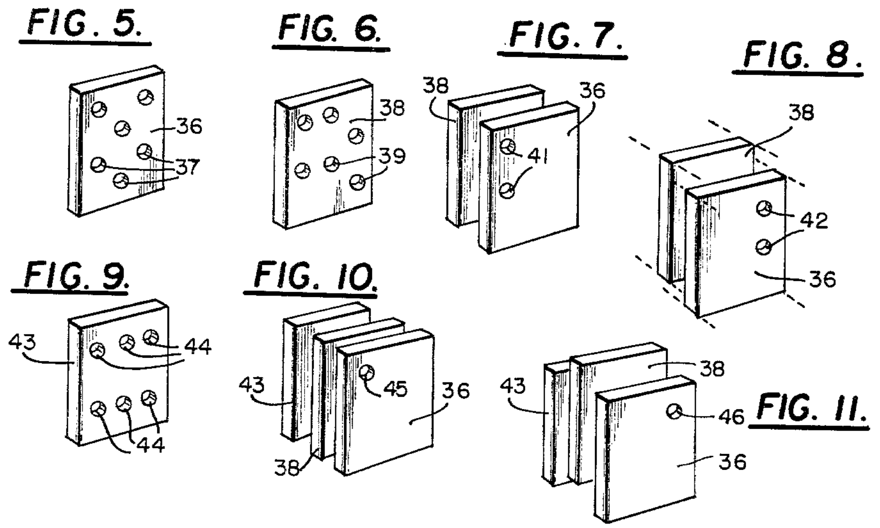
FIGS. 5, 6, 7, 8, 9, 10 and 11 are perspective views of light valves similar to that of FIG. 4 shown in different conditions of operation in accordance with the principles of this invention.

FIGS. 5 and 6 each show a card such as those which are incorporated in the selector 16 of FIG. 4. In FIG. 5, the card 36 is shown having holes 37 distributed in staggered relation in four rows. The card 38 illustrated in FIG. 6 has holes therethrough differently arranged in the same four rows. It is to be understood that the arrangement of the perforations of the cards illustrated in FIGS. 5 and 6 are merely for the purpose of explanation and do not represent all of the possible, or even preferable, combination of holes which may be utilized in this invention.

By the superposition of the card 36 upon the card 38, all of the holes are covered except in two locations where the holes 37 are aligned with the holes 39. These locations are designated 41 in FIG. 7 and are the only hole locations shown in that figure. In FIG. 8, the card 86 is shown superimposed on card 38 but one space-between-holes lower than card 38. In this position, there are only two locations where the holes 37 are aligned with the holes 39, and these two locations are different from those of FIG. 7. The aligned holes are designated 42 in FIG. 8 and are the only ones shown.

Thus by merely moving at least one of the cards 36 and 38 a small distance, light passing through the two cards 36 and 38 is switched from one set of positions to another. From this it can be seen that, if holes are arranged in preselected patterns in the cards, the positioning of the cards in a stack determines the location of light penetration through the stack.

FIG. 9 illustrates a third card 43 which may be combined with the other two cards 36 and 38. The card 43 has holes 44 therethrough arranged in two of the aforementioned four rows. The addition of this third card 43 to the stack of the other two cards 36 and 38, limits the alignment of the holes to but one location for each combination of card positions. Also, more combinations are possible with three cards than with two. This is illustrated in FIGS. 10 and 11. In FIG. 10 the three cards 36, 38 and 43 are arranged in-line, and the location designated 45 in the upper left corner represents the only position in which the holes in the three cards are aligned. In FIG. 11 the cards 43 and 36 are shown in-line, but the card 38 is displaced by a distance equal to the space-between-holes above the position of the others. In this particular combination, only the holes in the position designated 46 are aligned for the passage of light.

In addition to the combinations of card positions shown, there are other possible arrangements, and for each arrangement, there is only one location through which light will be allowed to penetrate. By way of example, in addition to the combinations shown in FIGS. 10 and 11, the cards can also be positioned with only card 43 or only card 36 raised above card 38, with cards 36 and 43 raised above 38, or with cards 38 and 43 raised above card 36. In each case there will be only one location where the holes will be aligned. With five cards, a larger number of combinations are possible, and a large number of bits of information may be represented by the stack. Since the positions of the individual cards, in this example, are essentially binary in nature (any card may occupy either one of two possible positions at any instant), the number of combinations which may be assumed by the stack is equal to the number 2 raised to a power represented by the number of cards in the stack. In other words, a stack of three cards can produce $2^3$, or eight, possible combinations; a stack of four cards can produce $2^4$, or 16, combinations; stack of five cards $2^5$, or 32, combinations, and so forth. For the purpose of this description, three cards have been shown in a stack, but, as pointed out above, any number may be used and a stationary mask having transparent portions only at those locations where light is permitted to pass will ordinarily be used. If the stacks were to be used to decode alphabetic and numeric characters, a five pulse code such as the standard teletype code could be used, and the stacks would each contain five cards. One position of each card would represented a mark, and the other position a space, and each card would be actuated in response to a particular pulse position of each letter, the stack of cards being actuated in parallel. Upon the receipt by the system of the pulse code of a character, the first card in the stack would assume the position of either a mark or a space in accordance with the signal contained in the first pulse position, the second card would assume the position representative of the signal of the second pulse position, and so forth. The movements of the cards in the stack would then produce alignment of holes in but one set of positions on the cards, and that one set of positions would represent the particular character which caused the unique alignment. To simultaneously represent a plurality of characters, a plurality of stacks could be used.

Figure 12:
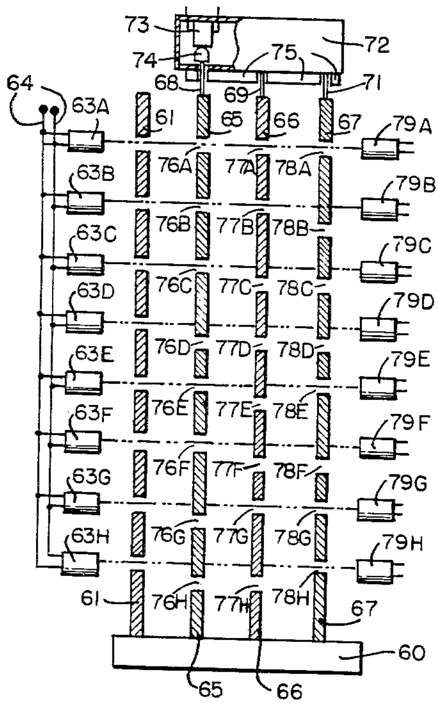
FIG. 12 is a sectional view of a light valve of this invention illustrating one pattern of operating apertures.

FIG. 12 has been provided to more graphically illustrate the manner of identifying each of eight different pieces of information by the manipulation of three cards. A base 60 supports a fixed mask 61 having eight substantially uniformly spaced openings or transparent portions 62A–H therethough. Adjacent each opening 62 is a lamp 63A–H, which lamps are arranged to transmit light into the corresponding openings 62. The lamps 63 are all connected to leads 64 and thereby to a source of electrical energy (not shown). Three cards 65, 66, and 67 are supported on one edge on the base 60 and are connected by wires 68, 69, and 71 respectively at other edges to an operating mechanism 72. A portion of the housing of the operating mechanism 72 has been shown broken away to provide a view of one of the solenoids in the interior. The solenoids each comprise a coil 73 and an axially movable magnetic core 74 connected to the wires 68, 69, and 71. Actuation of the solenoids lifts the cards 65, 66, and 67 against the stops 75, and de-energization of the solenoids causes the cards to move down to the base 60 which serves as the stop in the down position. Of course, other forms of motive means than solenoids may be used; the solenoids are shown as examples only.

The card 65 contains eight perforations 76A–76H which are each located adjacent an opening 62 or are slightly (but completely) below the corresponding opening 62A–H. Card 66 has similar perforations designated 77A–77H, and card 67 has perforations which are designated 78A–78H. Arranged adjacent card 67 and opposite the lamps 63 are eight photoelectric coils 79A–H.

In operation, the alignment of the perforations in the three cards 65, 66, and 67 having the same letter suffix with the corresponding opening 62A–H in the mask 61 allows light from the appropriate lamp 63A–H to fall upon the corresponding photoelectric cell 79. In FIG. 12, perforations 76A, 77A, and 78A are shown in line with the top opening 62A, allowing light from the top lamp 63A to impinge upon the top cell 79.

The light valve of FIG. 12 may designate any or all of eight characters, each character comprising three bits, by the energization of one of the eight photoelectric cells 79. For this discussion we shall assume that the up or upper position of any card may be represented by "1" and the lower or down position of the cards can be represented by "0." In addition, the information which produces either an upward or a downward movement of the cards will also be represented by the corresponding designation, 1 or 0. The first bit of a character will indicate one bit of information which is applied to the card 65, the second bit is that which is applied to card 66, and the third bit of the character represents the signal applied to card 67. In the condition shown in FIG. 12, the cards represent the character "000." To represent the character "100," card 65 would be moved upward by the solenoid 73 and those perforations 76D, 76G, and 76H which are below the corresponding opening 62 would be moved up into line with those openings. Light would not pass through perforations 76A, 76B, 76C, 76E, or 76F since all of these perforations have now moved up and out of correspondence with the openings 62A, B, E, and F. Light passing through perforation 76D will be blocked by card 66 since perforation 77D has not moved up. Light passing through 76H will be blocked by card 66 since perforation 77H has not moved up. Light passing through perforation 76G will pass also through perforations 77G and 78G since those perforations remain in their in-line positions, and light falls upon the seventh photo-cell 79F.

For the word "001" the second photo-cell 79B would be energized and light to the others blocked in the same manner. Thus, the indicated cells will be energized for each of the indicated characters:

| Character | Photo-electric cell position | |
|---|---|---|
| 000 | 1 | 79A |
| 001 | 2 | 79B |
| 011 | 3 | 79C |
| 111 | 4 | 79D |
| 010 | 5 | 79E |
| 011 | 6 | 79F |
| 100 | 7 | 79G |
| 110 | 8 | 79H |

The perforations are labeled on the drawing with the representation, 0 or 1, of the input information which will align them with the corresponding opening 62. In the light valve of FIG. 12, the cards have been shown elongated and moving in the direction of their length. The cards may also be arranged to move perpendicular to their length.

Figure 13:
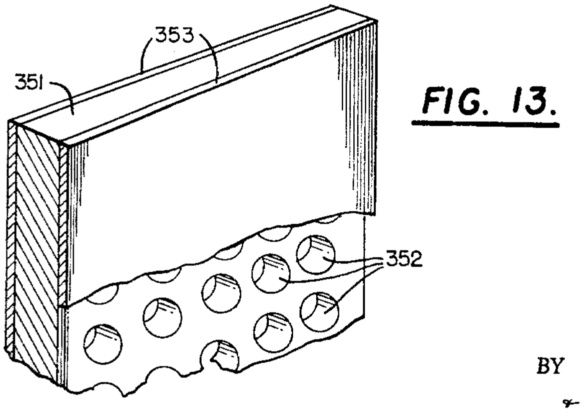
FIG. 13 is a perspective view, partially in section, of a single card of this invention.

In FIG. 13 a portion of a card is shown in section. The card comprises a base sheet 351 which may be formed of aluminum, steel, copper, plastic, paper or other suitable inexpensive materials. The base sheet 351 has perforations 352 therehrough, and covering both sides of the sheet are coatings 353 of an opaque material.

The base sheet 351 is pre-perforated by any of the modern techniques such as punching, etching, drilling, etc., to form the openings 352 at all locations on the sheet where such openings are desired. Subsequently, the openings are closed. In the illustration of FIG. 13, the openings 352 are shown covered by a thin opaque coating to close them to the passage of light, but if the openings are formed by punching the punched slugs may be reinserted into the openings. The particular method preferred is etching the holes to form clean openings 352 of the proper size with sharp edges. Since all sheets 351 are etched in accordance with the pattern of a single matrix master, the sheets 351 are identical. A lacquer which is sufficiently opaque to prevent light of the intensity used in this invention from passing therethrough and flows enough to completely cover the openings 352 with a coating of sufficient body to withstand considerable handling is then sprayed on both sides of the sheet 352.

Figure 14:
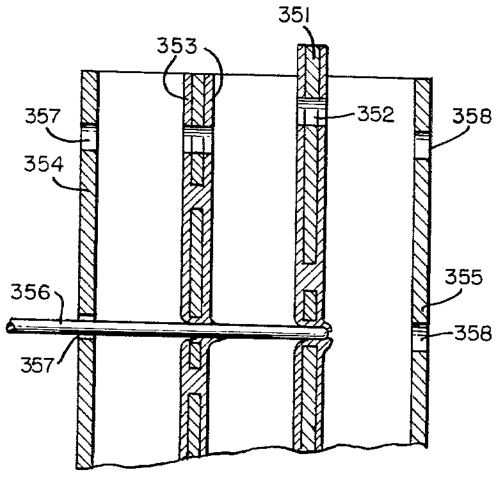
FIG. 14 is a sectional view of a portion of a function table showing the method of perforating the cards at the proper positions.

FIG. 14 illustrates the procedure followed in preparing an optical valve using the cards of FIG. 13. The cards, comprising base sheets 351 and coatings 353, are assembled in a housing one side of which forms a mask 354 on one side and may have a supplementary mask 355 on the other. The masks 354 and 355 have openings 357 and 358, respecitvely, aligned with the perforations 352 in the base sheet 351. The openings 357 and 358 represent all of the possible openings through which light may pass when the valve is in operation. To prepare an optical valve for operation in accordance with the principles of this inventon, a known signal is applied to the operating mechanism (not shown in FIG. 14 but similar to those of FIGS. 4 and 12) to move the cards into their operative positions. A generally cylindrical rod 356 is then passed through the valve at the openings 357 and 358 that have been selected for the passage of light in response to the particular input signal. The rod 356, which may be a wire, a punch or other such device, punctures the coatings 353 covering the perforations 352, opening those particular perforations to the passage of light.

In FIG. 14 the card to the right has been raised as by the application of a "1" signal to the operating mechanism and the card to the left is in its lower position in response to a "0" at the input. With the cards in the positions they would assume upon the application of the signal "01" to the input of the valve, the rod 356 is passed through the proper openings, in this example the lower ones, to remove the coating 353 from the cards and uncover the appropriate holes 352. Subsequently, whenever the signal "01" is applied to the operating mechanism, the openings thus prepared will pass light.

With the procedure outlined above, it is possible to prepare the base sheets 351 by mass production techniques, coating them also by inexpensive methods, and yet provide apparatus which is, in effect, custom made for each installation.

To prevent cross-talk (or at least to keep it to a minimum) it is desirable to coat each of the cards with a dull-finish, light-absorbing material. It has been found that spraying each side of each card with the black lacquer mentioned above effectively reduces the reflection of light among the cards to the point where cross-talk cannot be detected.

Movements of the cards may be easily kept to a small distance. Holes on $\frac{1}{16}$ inch centers with a diameter of $\frac{1}{32}$ of an inch have been found to be quite satisfactory for the purpose. A light weight sheet is readily moved $\frac{1}{16}$ of an inch, especially when the motion is limited by fixed stops which allow the use of forces sufficiently great to ensure rapid and positive movement of the cards and yet ensure proper alignment and consistent motions.

The above specification has described and the accompanying drawings have illustrated a new form of optical function table for directing, translating, storing and otherwise handling information. The function tables described and illustrated are, in fact, light valves in which each operation serves to convey information to a proper sensing unit. Other form and modifications of the apparatus described herein will become apparent to others skilled in the art without the exercise of invention, and it is therefore intended that this invention be limited only by the scope of the appended claims.

I claim:

1. Means for encoding an optical function table, said table comprising a stack of preperforated identical sheet members, a frangible opaque coating on each of said sheets covering the preperforated openings, means for moving every possible combination of said sheets relative to each other in response to input information to establish preselected arrangements of any possible combination of said sheets, piercing means for penetrating said deck at selected locations to remove said coatings from perforations in the path of said penetrating means to subsequently provide a free passage for light through said deck, said uncovered perforations being aligned for the passage of light whenever the same information is subsequently applied to said sheet moving means.

2. The invention according to claim 1, the material of said frangible opaque coating being of such a nature that a pin pushed through said sheets at any of said selected locations leaves a clean hole.

3. The invention according to claim 2, said opaque coating being adhered to both sides of each sheet.

4. The invention according to claim 3, said layer being a film of lacquer.

5. Means for encoding an optical function table, said table comprising a stack of preperforated identical sheet members, a frangible opaque coating on each of said sheet members covering the preperforated openings, means for laterally displacing at least some of said sheets relative to others of said sheets in response to input information to establish preselected arrangements of said sheets, piercing means for penetrating said sheets at selected locations to remove said coatings from perforations in the path of said penetrating means to subsequently provide a free passage for light through said stack, said uncovered perforations being aligned for the passage of light whenever the same information is subsequently applied to the means for displacing the sheets.

6. The invention according to claim 5, said frangible opaque coating being of such a nature that a pin pushed through the sheet at the location of one of said preperforated openings leaves a clean hole.

7. The invention according to claim 6, said frangible opaque coating being a layer of opaque material adhered to both sides of each sheet member.

8. The invention according to claim 7, said layer being a film of lacquer.

References Cited by the Examiner

UNITED STATES PATENTS

| | | | |
|---|---|---|---|
| 2,000,527 | 5/1935 | Linderman | 346—135 |
| 2,156,289 | 5/1939 | Hoy | 346—135 |
| 2,903,686 | 9/1959 | Bridges | 340—347 |
| 2,914,757 | 11/1959 | Millership et al. | 340—347 |
| 3,075,759 | 1/1963 | Kowaleski | 255—93 X |

WILLIAM W. DYER, Jr., *Primary Examiner.*

HUNTER C. BOURNE, *Examiner.*

F. T. YOST, *Assistant Examiner.*